Dec. 14, 1926.
H. E. ROBERTSON
1,610,970
VALVE LIFTER
Filed May 23, 1925
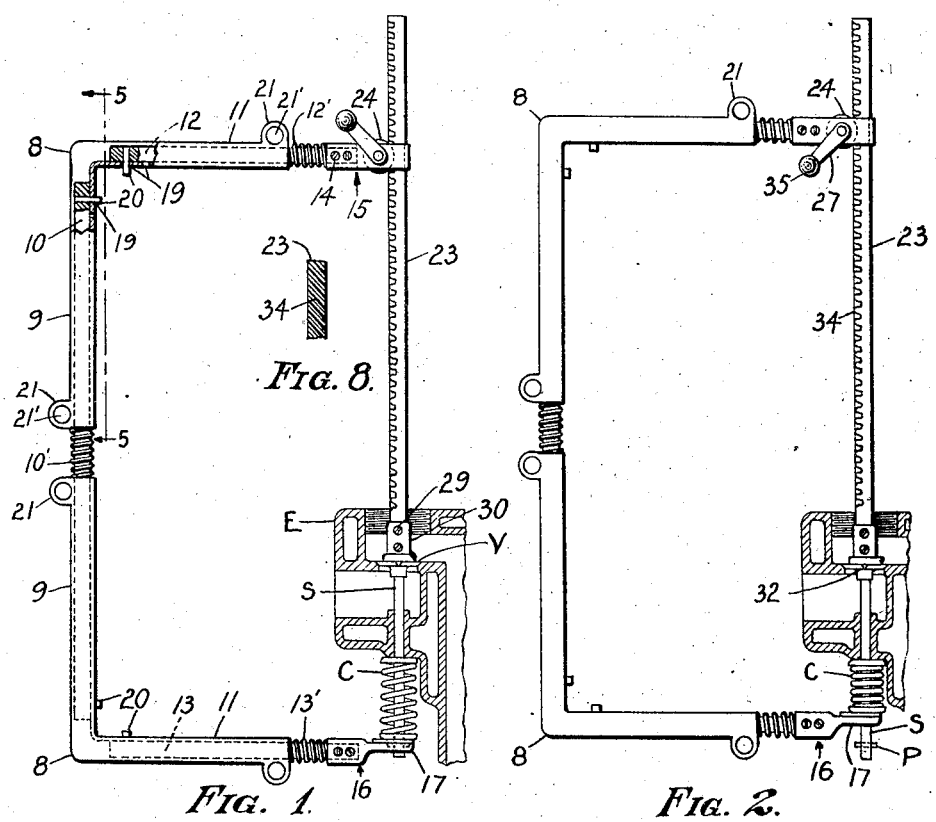
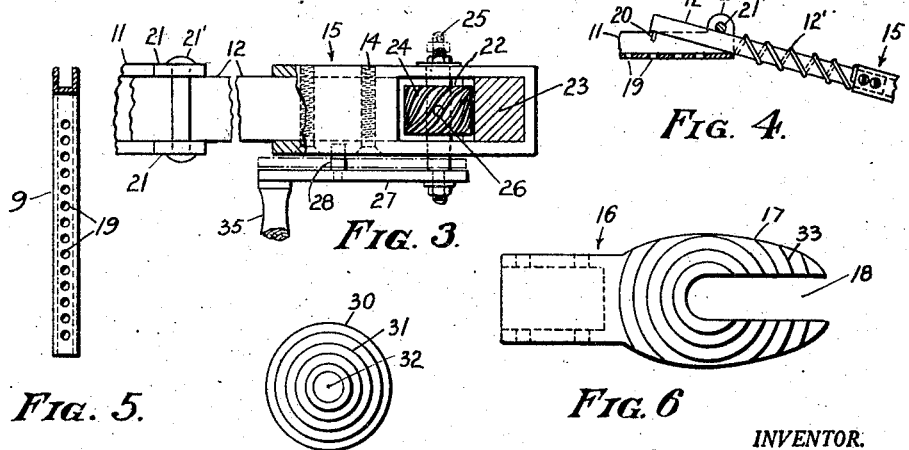
INVENTOR.
Hugh E. Robertson
BY M. C. Frank
ATTORNEY.

Patented Dec. 14, 1926.

1,610,970

UNITED STATES PATENT OFFICE.

HUGH E. ROBERTSON, OF OAKLAND, CALIFORNIA, ASSIGNOR OF ONE-HALF TO STANFORD B. NICKELS, OF OAKLAND, CALIFORNIA.

VALVE LIFTER.

Application filed May 23, 1925. Serial No. 32,335.

My invention relates to valve lifters, and more particularly to valve lifters for internal combustion engines in common use in motor vehicles.

Valve lifters for the above engines and with which I am familiar, are not adaptable for ready use on all T or L head motors, hence, different size and design of valve lifters are required to be kept on hand to accommodate the various types of engines of the different automobiles driven into a garage or repair shop for service attention.

It is an object of my invention, to provide a valve lifter having but few simple parts, which, by design and structure can accommodate and function on the general types of automobile engines for the lifting and removal of the valves thereof. The operating parts of my lifter when in service are above the cylinder heads and easily manipulated, and the lifting parts move coaxially with the valve stem.

With this end in view I attain the above and other objects by the novel features of construction, form and arrangement of the elements of my invention. The accompanying sheet of drawings forming a part of this specification, illustrates the preferred embodiment of the invention, and what I claim as new is particularly pointed out in the appended claims following the specification.

Figure 1 of said drawings is a side elevation of the device positioned on the valve of an engine and ready to be manipulated to compress the valve spring, and Fig. 2 is a similar view but showing that the said spring has been compressed and the retaining valve pin exposed for removal.

Fig. 3 is a plan, on an enlarged scale, of the operating terminal socket of the upper arm of the device and the end of the adjacent right-angled member; the sliding bar or rack is shown in cross-section at the pinion and a portion of the socket upper wall is broken away.

Fig. 4 is a view in partial section of part of the upper arm of the device to show the manner of adjustably lengthening the arm. This manner is employed at each end of each of the right-angled members.

Fig. 5 is a side view in section on the line 5—5 of Fig. 1 showing a series of holes to accomplish the adjustability of the invention. This may also be considered a view of the other leg looking at right-angles to the line 5—5.

Fig. 6 is a face view of the clawed lifting foot, the terminal socket of the lower arm; and Fig. 7 is a similar view but of the pressure head of the rack; and Fig. 8 is a face view of a portion of the rack member of the device showing the teeth thereon.

Referring to the figures in detail: The letter E indicates a conventional automobile engine, V a valve therefor, S the stem of the valve, C the coil spring encircling the stem and P the pin in the stem for retaining the said parts in operative position.

My invention consists of a device operable on the above-enumerated engine elements, and comprises a framed structure having a pair of similar right-angled metallic members 8, preferably formed hollow or channel-like and of suitable strength. To the longer leg 9 of each member 8, is slidingly fitted a rod 10 of a length to telescopically engage the full length of both legs 9 for a purpose to be presently set forth. To the other leg 11 of each of the said members 8 is likewise slidingly fitted a terminal rod. 12 is the terminal rod forming the upper arm of the device, when in use, and 13 the terminal rod forming the lower arm.

To the outer or free extremity of the upper rod 12 is secured, as by screws 14, a terminal socket 15 which I term the "operating" terminal. To the outer or free extremity of the lower rod 13 is secured, in a similar way, a terminal socket 16 having a forked or clawed lifting foot 17, the width of opening 18 between the claws being sufficient to freely caliper over the valve stem S.

Each leg of the right-angled members 8 has a series of suitable holes 19 therethrough to receive a pin 20. The pin is formed as an integral part of each end of the rods within the legs to adjustably assemble the parts forming the frame. Encircling the exposed part of the rods 10, 12 and 13 are coil springs 10', 12' and 13', each spring adapted to abut the ends of the members thereat and keep them in rigid distention.

The walls of the channel structure 8 have opposed ears 21 formed as a part thereof at each end, and a rivet or the like 21' is secured therein to bridge over the channel (Fig. 3) for a purpose to be set forth in the operation of the device.

The socket 15 has an opening 22 formed therethrough to house a movable rack 23 and a pinion 24. The latter is secured to a shaft 25 by any suitable means such as a key pin 26 driven through the pinion and shaft, the key being filed off flush with or to the bottom of the pinion threads. The shaft projects through the socket walls, and to one end of the shaft is secured a crank 27 having a projection 28 on its inner face.

The rack 23 is of a length suitable in combination with the frame, to engage the valve of the type of engine referred to. The lower end of the rack is secured, as by screws 29, in the socket of a pressure head 30, which latter is of a suitable size and design to engage the top of the valve V. The face of the head may have non-slipping ridges 31 formed thereon (Fig. 7) and a central tit 32. Likewise the lifting foot 17 may have similar non-slipping ridges 33. The tit 32 will centralize the rack on the valve head in the usual countersunk center on the head. The rack has oblique teeth 34, which engage the teeth formed spirally on the pinion, and the teeth are of a determined pitch, so that the rack and the pinion are substantially always in locked engagement yet freely movable by pressure applied to the handle 35 of the crank.

In operation, the mechanic observes the engine valve he is about to remove, and accordingly adjusts the frame longitudinally and transversely to suit surrounding conditions, such as projections and pipes on the engine which otherwise might interfere. The adjustment is accomplished by pressing down or inwards on the terminal rod 12 for example (Fig. 4), and pulling or pushing the same, as the case may be, to the desired extension and then by reversing the movement of the rod the pin 20 will engage the selected hole 19, the coil spring 12' extending or compressing during the adjustment and finally holding the parts in rigid distention. The rivet 21' acts as a lock for the device against the separation of the parts, and also as a bearing for the rod while adjusting an extension. The adjustments to each of the other rods is accomplished in a similar manner. After the device is set as shown in Fig. 1, a continued movement of the turning of the handle 35 draws the frame upward on the rack 23 and compresses the spring S to the desired amount, the locking threads supporting the device when the hand is removed. But to insure a non-slippage of the rack and pinion, the crank may be turned until its projecting pin 28 is above the surface of the terminal socket 15 and at which time the crank and attached shaft 25 is pushed forward to the dot-and-dash position shown in Fig. 3, the pin 28 reacting and bearing on the said surface, sufficient clearance on the side of the pinion being allowed for this lateral displacement. The exposed valve stem pin P Fig. 2, may now be removed at will, and the device released by a reverse action of the operating terminal.

I claim:

1. A valve lifter for internal combustion engines, comprising a frame having an upper and lower terminal, the upper of said terminals provided with a sliding bar, the latter having means at an end thereof adapted to engage the top of a valve of the engine and the lower of said terminals provided with means adapted to straddle the stem of said valve and engage the coil spring encircling the same, the said sliding bar being an obliquely toothed rack; and a pinion rotatably mounted on said upper terminal and having teeth formed spirally thereon for lockingly engaging the teeth of the rack and for moving the bar so as to effect the compression of the said spring for valve pin removal.

2. A valve lifter for internal combustion engines, comprising a frame having an upper and lower terminal, the upper of said terminals provided with a sliding bar, the latter having means at an end thereof adapted to engage the top of a valve of the engine and the lower of said terminals provided with means adapted to straddle the stem of said valve and engage the coil spring encircling the same, the said frame being adjustable vertically and horizontally to embrace the valves of internal combustion engines of different size and design, the said sliding bar being an obliquely toothed rack; and a pinion rotatably mounted on said upper terminal and having teeth formed spirally thereon for lockingly engaging the teeth of the rack and for moving the bar so as to effect the compression of the said spring for valve pin removal.

3. In a valve lifter, a frame comprising two channeled members, each having two legs at an angle to each other, and each leg having in its bottom a series of perforations; two terminal rods and an intermediate rod adapted to slide within the respective legs, the intermediate rod having at each end a pin, and each of the terminal rods also having at one end a pin, said pins being adapted to engage selectively one of said perforations; ears formed opposite to each other in the walls of each leg at the ends thereof; an element secured to each pair of opposite ears and bridging the channel between the ears and spaced from the respective rod so as to allow the rod to be tilted sufficiently for the pin thereon to clear the bottom of the respective leg; a pinion rotatably mounted at the other end of one terminal rod; a slidable rack in engagement with the pinion, the lower end of the rack being provided with a head adapted to engage the top of a valve of an internal combustion engine; a forked foot secured to the other end of the other terminal rod and adapted to straddle the stem of said valve; and means for rotating said pinion.

4. In a valve lifter, a frame comprising two channeled members, each having two legs at an angle to each other, and each leg having in its bottom a series of perforations; two terminal rods and an intermediate rod adapted to slide within the respective legs, the intermediate rod having at each end a pin, and each of the terminal rods also having at one end a pin, said pins being adapted to engage selectively one of said perforations; ears formed opposite to each other in the walls of each leg at the ends thereof; an element secured to each pair of opposite ears and bridging the channel between the ears and spaced from the respective rod so as to allow the rod to be tilted sufficiently for the pin thereon to clear the bottom of the respective leg; a shaft slidably and rotatably mounted at the other end of one terminal rod, the shaft having a pinion secured thereon; a slidable rack in engagement with the pinion, the lower end of the rack being provided with a head adapted to engage the top of a valve of an internal combustion engine; a forked foot secured to the other end of the other terminal rod and adapted to straddle the stem of said valve; a crank secured to said shaft and provided with a handle for rotating the shaft; and a projection on said crank adapted to contact with the shaft mounting for preventing a backward movement of the rack when the crank is pushed toward the shaft mounting.

5. In a valve lifter, a frame comprising two channeled members, each having two legs at an angle to each other, and each leg having in its bottom a series of perforations; two terminal rods and an intermediate rod adapted to slide within the respective legs, the intermediate rod having at each end a pin, and each of the terminal rods also having at one end a pin, said pins being adapted to engage selectively one of said perforations; ears formed opposite to each other in the walls of each leg at the ends thereof; an element secured to each pair of opposite ears and bridging the channel between the ears and spaced from the respective rod so as to allow the rod to be tilted sufficiently for the pin thereon to clear the bottom of the respective leg; a pinion rotatably mounted at the other end of one terminal rod; a slidable rack in engagement with the pinion, the lower end of the rack being provided with a head adapted to engage the top of a valve of an internal combustion engine; a forked foot secured to the other end of the other terminal rod and adapted to straddle the stem of said valve, said head and said foot having non-slipping ridges thereon; and means for rotating said pinion.

6. In a valve lifter, a frame comprising two channeled members, each having two legs at an angle to each other, and each leg having in its bottom a series of perforations; two terminal rods and an intermediate rod adapted to slide within the respective legs, the intermediate rod having at each end a pin, and each of the terminal rods also having at one end a pin, said pins being adapted to engage selectively one of said perforations; ears formed opposite to each other in the walls of each leg at the ends thereof; an element secured to each pair of opposite ears and bridging the channel between the ears and spaced from the respective rod so as to allow the rod to be tilted sufficiently for the pin thereon to clear the bottom of the respective leg; a pinion rotatably mounted at the other end of one terminal rod; a slidable rack in engagement with the pinion, the lower end of the rack being provided with a head adapted to engage the top of a valve of an internal combustion engine; a forked foot secured to the other end of the other terminal rod and adapted to straddle the stem of said valve, said head having a tit adapted to engage the usual countersink in the the valve so as to centralize the rack thereon; and means for rotating said pinion.

7. In a valve lifter, a frame comprising two channeled members, each having two legs at an angle to each other, and each leg having in its bottom a series of perforations; two terminal rods and an intermediate rod adapted to slide within the respective legs, the intermediate rod having at each end a pin, and each of the terminal rods also having at one end a pin, said pins being adapted to engage selectively one of said perforations; ears formed opposite to each other in the walls of each leg at the ends thereof; an element secured to each pair of opposite ears and bridging the channel between the ears and spaced from the respective rod so as to allow the rod to be tilted sufficiently for the pin thereon to clear the bottom of the respective leg; a pinion rotatably mounted at the other end of one terminal rod; a slidable rack in engagement with the pinion, the lower end of the rack being provided with a head adapted to engage the top of a valve of an internal combustion engine; a forked foot mounted at the other end of the other terminal rod and adapted to straddle the stem of said valve; a coil spring encircling each rod and abutting the ends of said members and said mountings; and means for rotating said pinion.

In testimony whereof I affix my signature.

HUGH E. ROBERTSON.